United States Patent [19]

Hoffken

[11] Patent Number: 4,831,771
[45] Date of Patent: May 23, 1989

[54] SPOOL HOLDER AND SPOOL

[76] Inventor: Fred H. Hoffken, 7 Gartley Dr., Newtown Square, Pa. 19073

[21] Appl. No.: 187,020

[22] Filed: Apr. 27, 1988

[51] Int. Cl.⁴ .......................................... A01K 97/06
[52] U.S. Cl. ..................................................... 43/54.1
[58] Field of Search ................. 43/54.1, 57.1, 57.2; 242/74, 118, 125-125.3

[56] References Cited

U.S. PATENT DOCUMENTS

| | | | |
|---|---|---|---|
| 335,491 | 2/1886 | Wells | 43/57.2 |
| 940,132 | 11/1909 | Creasey | 43/57.1 |
| 2,730,833 | 1/1956 | Newell | 43/57.2 |
| 2,956,365 | 10/1960 | Smith | 43/57.1 |
| 3,042,329 | 7/1962 | Signorella | 242/125.1 |
| 3,729,856 | 5/1973 | Ziemba | 43/57.1 |
| 3,814,344 | 6/1974 | Cook | 242/74 |
| 4,030,226 | 6/1977 | Schaefers | 43/57.2 |
| 4,262,854 | 4/1981 | Jett | 242/74 |
| 4,445,770 | 5/1984 | Morse | 242/74 |

Primary Examiner—Gene P. Crosby
Attorney, Agent, or Firm—Steele, Gould & Fried

[57] ABSTRACT

A spool holder and spool is disclosed for equipping sport fishing boats to handle a plurality of large diameter lures and lengths of high test monofiliment line in a minimum operative storage area. A plurality of large spools are mounted for rotation upon a sturdy base and the spools are designed to wind and store at least fifty feet of heavy fishing line. A plurality of hook holding bars are provided in spaced locations from the spools to permit the storage of the lures in longitudinally and transversely staggered arrangement. The spools themselves are provided with arcuate recesses in the line storage area to provide additional space to receive end knots or fittings in a manner not to detract from the available line storage area.

16 Claims, 3 Drawing Sheets

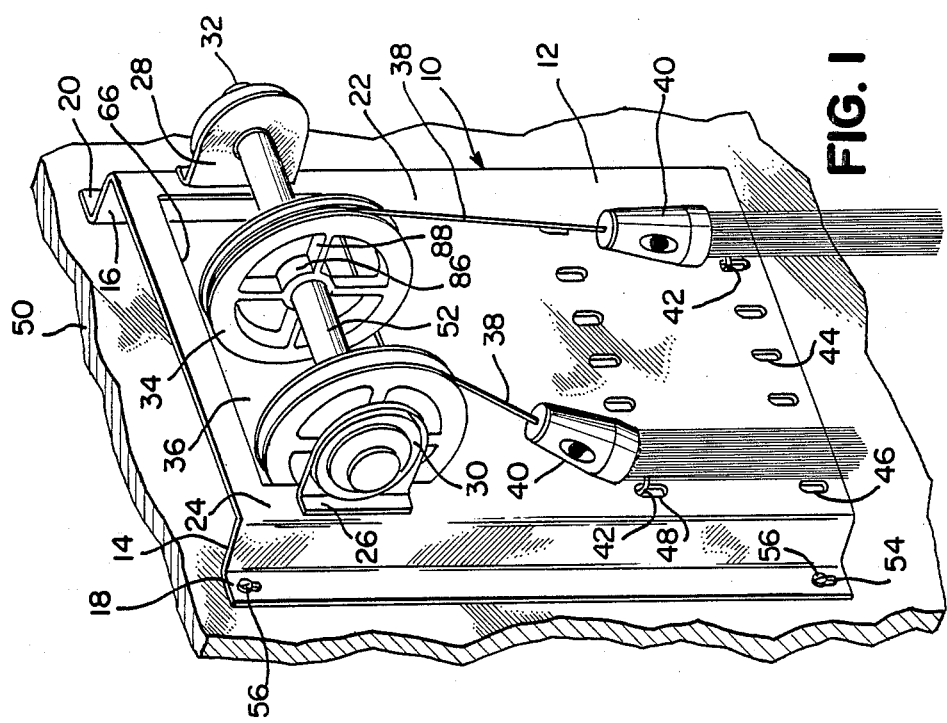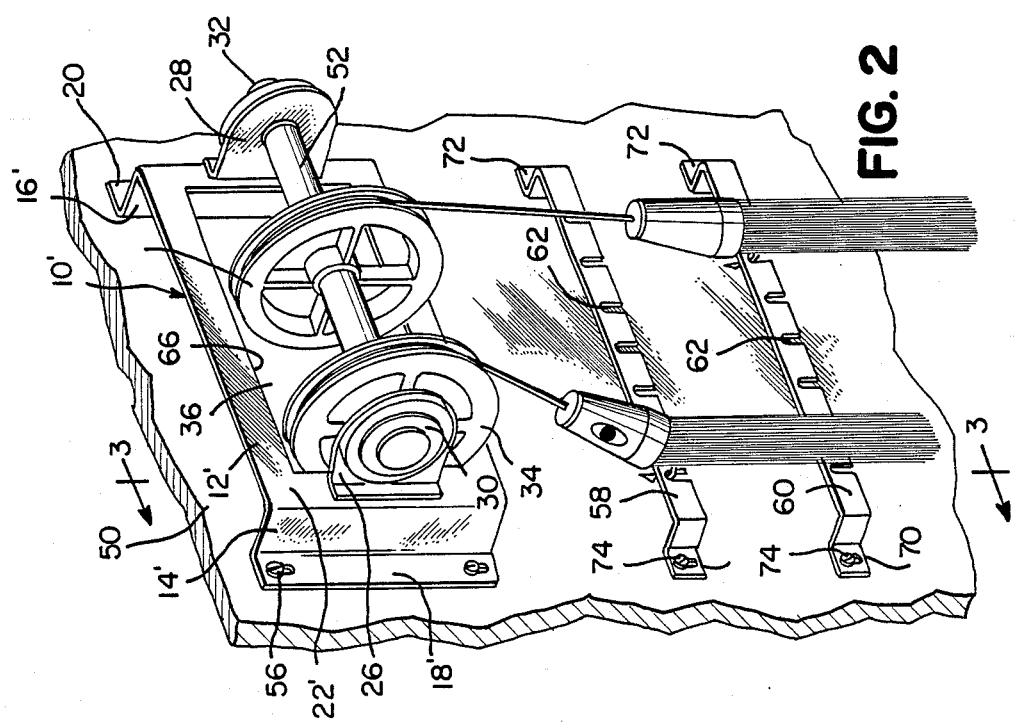

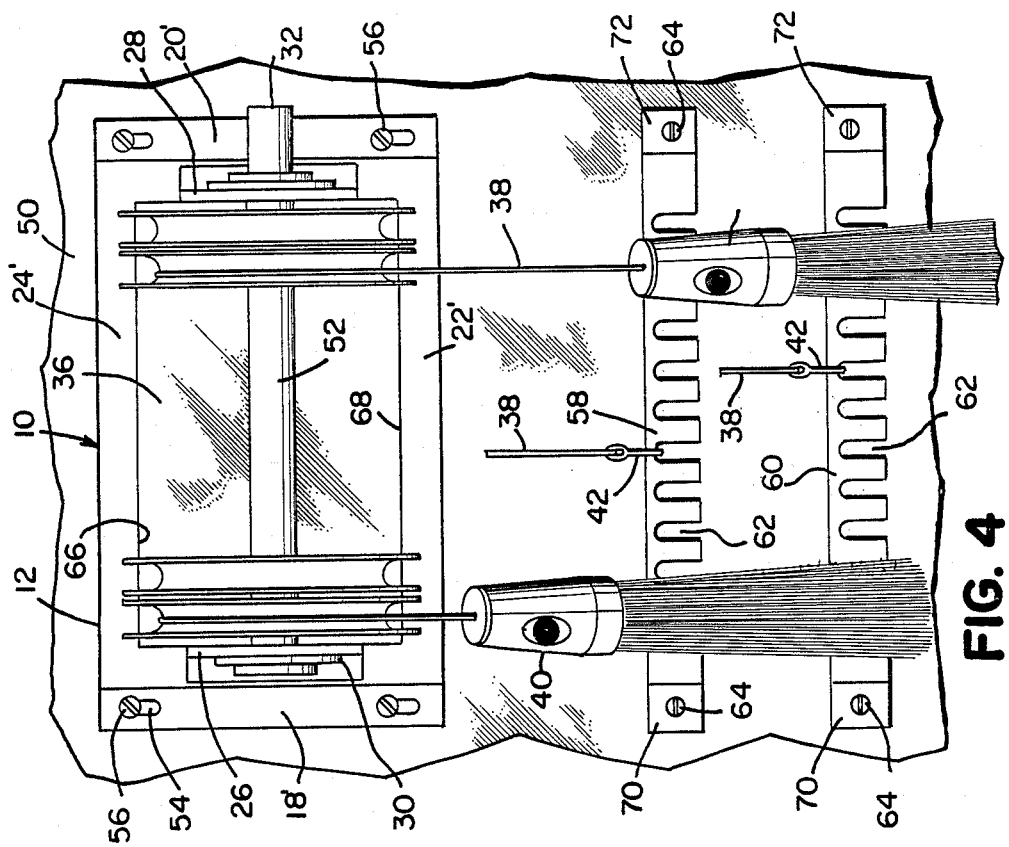
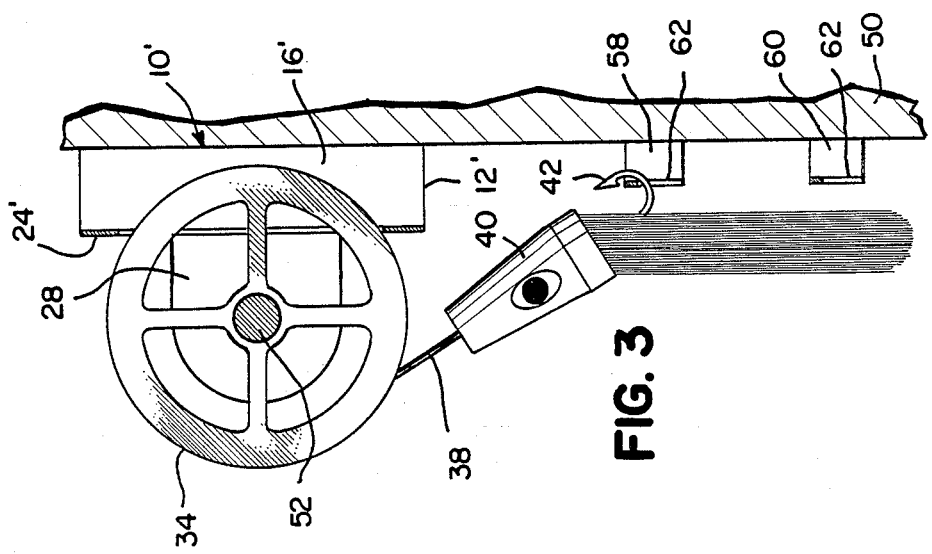

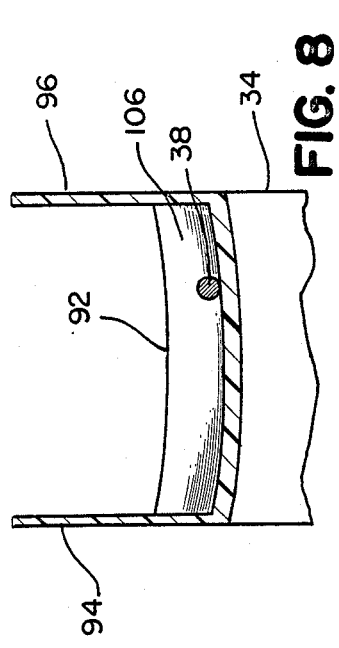
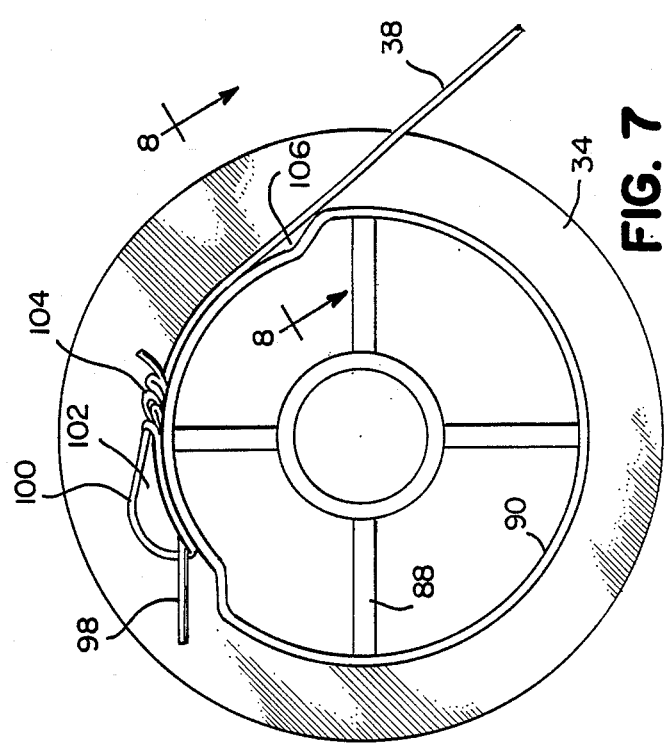
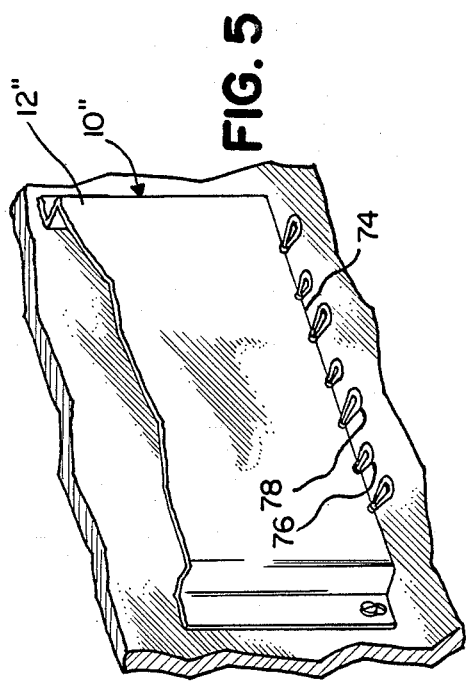
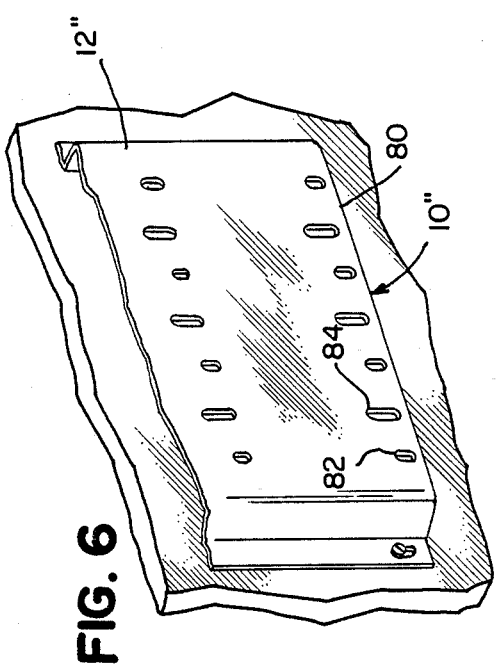

SPOOL HOLDER AND SPOOL

BACKGROUND OF THE INVENTION

1. Field of the Invention

The present invention relates generally to the field of fishing equipment, and more particularly, is directed to a spool holder suitable for use with large fishing lures and with extremely sturdy fishing line such as three hundred pound test monofilament and to a spool particularly designed to accommodate a sufficient length of the heavy monofiliment line.

2. Discussion of the Prior Art

When fishing for large game fish, it is necessary to employ extremely sturdy equipment in order to prevent unwanted breakage. In the event of a strike by a large fish, and the fish escaped due to equipment failure, the entire purpose of the fishing outing would then be frustrated. When seeking such large fish, it is the common practice to employ large lures to simulate the travel of a smaller fish through the water to thereby appear as an appetizing meal to the larger fish. Because of the need to provide for large game fish, sturdy equipment, it is the common practice to manufacture lures as large as $2\frac{1}{4}$ inches or $2\frac{1}{2}$ in diameter to conceal one or more large hooks therewithin. The lure and the hook or hooks concealed within the lure are affixed to strong, monofiliment line suitable for the purpose, such as up to three hundred pound test monofiliment line. Such sturdy monofiliment line can be from 1/16 inch in diameter to as large as $\frac{1}{8}$ inch in diameter and thereby requires a considerable winding area when wound upon a line storage spool. As the diameter of the line increased, the presently available spools have proven to be inadequate in size in that the prior art spools were unable to store a sufficient length of fishing line for the purpose, for example a minimum of fifty feet.

In view of the number of large game fish species that may be present at any given time and in view of the varying appetites and desires of game fish from time to time, the prior workers in the art have found it appropriate to provide a plurality of different lures in order to properly equip a game fishing boat. It is now the common practice to equip each lure with its own individual line in order to allow each lure to be readily used whenever desired without requiring additional preparation time. It has therefore been necessary to develop suitable equipment and systems to maintain the individual lures and the lines attached thereto in an orderly fashion to prevent tangling and to make each of the lures readily available for individual use whenever necessary or desired.

To accommodate a plurality of large lures with the desired length of heavy test line attached thereto, prior workers in the art have developed specially designed spool holding fixtures wherein a plurality of line storing spools can be maintained upon a single shaft in side by side relationship. The shaft may be either provided with a crank for manual operation or with an extended shaft for motor operation whereby the line and the lure attached to the line can be readily retrieved by turning the shaft. Once such a device that is currently available is manufactured by Darby Metal Products Co., Essington, Pa., and sold under the trademark "Reel-a-Rig".

It has been found that due to the increasing size of the lures and the lines now popularly employed, the previously designed "Reel-a-Rig" spool holding fixture was unsuitable for use with the number of spools normally carried. This was caused by the fact that the spools were normally $\frac{3}{4}$ inch in thickness whereas the lures themselves were much greater in diameter, for example on the order of 2 inches to as much as $2\frac{1}{2}$ inches. Under the circumstances, the lures could not be held in side by side juxtaposition in vertical registry below their respective associated spool.

SUMMARY OF THE INVENTION

The present invention relates generally to a spool holder suitable for use with large diameter spools and large fishing lures, and more particularly, is directed to a spool holder suitable to maintain stored lures in staggered orientation within a minimum storage area.

In accordance with the present invention, a sturdy base is fabricated of sheet metal, preferably stainless steel, to rotatively secure a plurality of large spools thereon. In the preferred embodiment, the base is equipped with a cut-out spool receiving area suitable to receive in rotative arrangement a plurality of laterally juxtaposed spools therewithin. In accordance with the embodiments of the present invention, strong metallic bases have been designed to accommodate as many as ten large diameter, for example, 6 inch diameter spools to as many as twenty medium diameter spools, for example spools that are 3 inches in diameter. The spool size in each instance is selected to receive and retain thereon approximately fifty feet of high test monofiliment fishing line.

In order to provide for larger and heavier lures equipped with at least fifty feet of three hundred pound test monofiliment line, a 6 inch diameter spool has been developed to provide a peripheral, channel-shaped line receiving area of sufficient dimensions to store the fifty feet of three hundred pound test monofiliment fishing line. An arcuate recess is provided in the base of the channel-shaped area that extends through an arcuate distance of approximately one hundred and ten degrees. A non-radial pin is provided at one end of the arcuate recess to receive and secure a loop or knot provided in one end of the high test monofiliment line. The knot itself or in some instances when a metallic swivel fitting is employed, the knot or fitting will fall naturally into the recess to thereby not subtract anything from the storage area available for winding the fifty feet of monofiliment line to be stored on the spool itself.

At the present time, the six inch diameter spools are fabricated of $\frac{3}{4}$ inch width whereby a plurality of ten 6 inch diameter, $\frac{3}{4}$ inch width spools can be stored on the same shaft in a lateral distance of approximately $7\frac{1}{2}$ inches. However, it would be impossible to store the lures in the same $7\frac{1}{2}$ inch lateral distance in side by side juxtaposition due to the very bulk and thickness of the lures now being utilized. For example, if all of the ten lures respectively connected to ten spools were 2 inches in diameter, then of course, it would require 20 inches of lateral distance to accommodate the lures affixed to the monofiliment lines wound upon the ten 6 inch spools as above discussed. Due to the size of the lures, some special provisions for lure storage had to be developed in order to maintain the spool and lure storage base to a managable size.

To provide an orderly arrangement for the lures in a minimum space and to prevent tangling without limiting ready access to the individual lures, it is a feature of the present invention to provide a spool holder having a plurality of hook holder means in varying spaced relationship to the spools and the spool shaft. By staggering the vertical spacing of the multiple hook holder means, the various lures can be correspondingly staggered to thereby store the maximum number of large lures neatly within a minimum storage area.

It is therefore an object of the present invention to provide an improved spool holder and spool of the type set forth.

It is another object of the present invention to provide a novel spool holder and spool including means to store a plurality of large fishing lures in a minimum storage area.

It is another object of the present invention to provide a novel spool holder and spool suitable to accommodate a plurality of large diameter spools in lateral juxtaposition and including means to store large lures in staggered positions in respectively spaced locations from the large diameter spools themselves.

It is another object of the present invention to provide a novel spool holder and spool comprising a stainless steel base, the base being provided with a cut-out area to receive peripheral portions of the line storing spools therewithin, journal means to rotatively carry a shaft upon which a plurality of spools are retained in side by side juxtaposition, means to rotate the shaft to wind the lines upon the respective spools and staggered means to receive the lure hooks in a manner to stagger the stored distances of adjacent lures from the spool holding shaft.

It is another object of the present invention to provide a novel spool holder and spool that is extremely sturdy in construction, inexpensive in manufacture and trouble free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 1 is a perspective view of a spool holder holding a plurality of spools and storing a plurality of large lures in accordance with the teaching of the present invention.

FIG. 2 is a perspective view of a first modified spool holder.

FIG. 3 is an enlarged a side elevational view of the spool holder of FIG. 2.

FIG. 4 is a top plan view of the spool holder of FIG. 3.

FIG. 5 is a parial, perspective view of a second modified spool holder.

FIG. 6 is a parial, perspective view of a third modified spool holder.

FIG. 7 is an enlarged, side elevational view of a large diameter spool, partially broken away to expose interior construction details.

FIG. 8 is a cross sectional view taken along line 8—8 on FIG. 7, looking in the direction of the arrows.

DESCRIPTION OF THE PREFERRED EMBODIMENTS OF THE INVENTION

Although specific terms are used in the following description for the sake of clarity, these terms are intended to refer only to the particular structure of the invention selected for illustration in the drawings, and are not intended to define or limit the scope of the invention.

Referring now to the drawings, there is shown in FIG. 1 a spool holder 10 which comprises generally a channel-shaped base 12 having a planar web or body 22 and depending mounting legs 14, 16. The mounting legs 14, 16 terminate downwardly in respective, outwardly bent, mounting flanges 18, 20 for securing to a vertical surface, for example, a vertical bulkhead 50 of a conventional sport fishing boat that is suitably positioned to receive the spool holder. A plurality of large diameter spools 34 are rotatively mounted upon a shaft 52 which is secured to the body 22 in known manner, for example by employing left and right shaft mounting brackets or pillow blocks 26, 28. The shaft mounting brackets can be conventionally secured to the top surface 24 of the planar body 22 in known manner, for example, by employing fasteners, rivets or by spot welding.

As shown, the spool holder body 22 is preferably cut to provide a rectangular spool receiving opening 36 to receive portions of the outer peripheries of the spools 34 therewithin in a manner to provide a compact design. In the manner illustrated, the left and right shaft mounting brackets 26, 28 are secured to the body 22 immediately adjacent the sides which define the spool receiving opening 36. While only two large diameter spools 34 are illustrated in FIG. 1 for purposes of clarity, it will be appreciated that normally, ten or more spools can be mounted upon the shaft 52 in side by side juxtaposition to thereby accommodate a considerable number of different lures 40 in a single, compact construction.

The shaft mounting brackets 26, 28 are each equipped with bearings 30 in known manner to rotatively journal the shaft 52 therebetween. The individual spools 34 are provided with radially oriented openings (not shown) with set screws with springs therewithin in known manner to bias balls or similar objects against the outer periphery of the shaft to provide an adjustable frictional drag. Such frictional drag adjustment is well known in the art and need not be further described at this time. Accordingly, the drag of each of the shaft mounted large diameter spools 34 can be individually adjusted to suit the needs of a given situation. The mounting of flanges 18-20 can be provided with slotted mounting openings 54 for securing the spool holder to the bulk head 50 by employing a plurality of conventional fasteners 56. Preferably, to increase the relative strength of the body 22 at the spool receiving opening 36, the upper and lower edges 66, 68 about the opening 66, are downwardly bent to provide the stiffening effect afforded by the bent members.

As hereinafter more fully set forth, each large diameter spool 34 is fabricated to be suitable for use with relatively large fishing lures 40 and extremely strong fishing line 38, for example lures having dimensions within the 2 inch to 2½ inch diameter range and monofiliment line in the three hundred pound test range. The large diameter spools 34 are particularly designed and fabricated to be able to store at least approximately fifty feet of three hundred pound test monofiliment fishing line.

Still referring to FIG. 1, in order to store the maximum number of large fishing lures 40 in a minimum space using the spool holder base 12, it is an important feature of the present invention to stagger the longitudinal spacing of the lures 40 from the spools 34. It will be appreciated that the large diameter spools 34 can be designed approximately ¾ inch in thickness in order to accommodate at least fifty feet of three hundred pound test monofiliment line. Therefore, in order to mount ten separate lures (and therefore ten separate spools) in the spool holder 10, a transverse distance of at least 7½ inches will be required.

In contrast, the size of the lures necessary to accompany large hooks 42 in a manner to shield the hooks from detection by the fish can be in the neighborhood of 2 inches to 2½ inches in diameter. Accordingly, when employing such large equipment, the staggered arrangement of the lures has proved to be a feasible alternative to increasing the length of the hook holding bars as necessary to accommodate all of the lures in side by side juxtaposition in transverse alignment. In order to stagger the respective position of the plurality of large lures 40, the planar body 22 of the base 12 can be provided with a lower row 46 of hook receiving openings 44 and an upper row 48 of hook receiving openings 44. While only two rows of hook receiving openings are illustrated, it will be appreciated that additional, similar rows of hook receiving openings can also be provided in the base 12 whenever required by the size and number of the lures 40 to be accommodated.

As illustrated, all of the hook receiving openings 44 are elongated in nature and of sufficient size to easily receive therein the hook portions of the fish hooks 42 whereby the lures 40 and their associated hooks 42 can be neatly and safely maintained on the spool holder 10 upon winding the large diameter spools 34 on the shaft 52. The shaft 52 terminates laterally in a shaft drive end 32 for shaft rotation purposes. In a manual model, a hand crank (not shown) can be affixed to the shaft drive end 32 in known manner to permit rotation of the shaft 52 to wind the monofiliment line 38. In a mechanized embodiment, the shaft drive end 32 can be connected to a motor operator (not shown) whereby the shaft 52 can be rotated under motor power to wind the fishing line 38 about the spools 34.

As shown in FIG. 1, the hook receiving openings 44 of the lower row of openings 46 are laterally offset from the hook receiving openings 44 comprising the upper row of openings 48. In this manner, laterally juxtaposed lures 40 are offset one from the other both laterally and longitudinally to thereby permit the accommodation of the maximum number of lures 40 in the minimum amount of spool holder space. The precise alignment of the parts permits a neat, safe and uncomplicated storage of a plurality of large diameter lures and fifty foot lengths of high test monofiliment line within a convenient storage area.

Referring now to FIGS. 2, 3 and 4, a modified spool holder 10' is illustrated wherein the hook holders are fabricated separately from the base 12'. As illustrated, the base 12' is abbreviated in nature and is designed of size suitable to mount the shaft 52 in similar manner to retain thereon a plurality of large diameter spools 44, for example, ten ¾ inch spools in side by side juxtaposition. The modified base 12' is cut or otherwise formed to provide a rectangular spool receiving opening 36' of similar size and dimensions to the spool receiving opening 36 as shown in FIG. 1. The upper and lower edges 66', 68' defining the opening 36 are preferably provided with downwardly bent flanges (not shown) for strengthening purposes in known manner. Left and right pillow blocks or shaft mounting brackets 26', 28' affix to the top surface 24' of the planar base body 22' in conventional manner to journal the shaft 52' within suitable bearings 30' in known manner. The plurality of large diameter spools 34 are frictionally secured upon the shaft 52' in known manner to be rotated when the shaft itself is rotated. In the manner hereinabove set forth, the shaft drive end 32' may be equipped either with a hand crank (not shown) or a motor drive (also not shown) to rotate the shaft for line winding purposes.

The modified base 12' terminates laterally in left and right mounting flanges 18', 20', which flanges are provided with elongated mounting openings 54' to facilitate affixing the modified spool holder 10' to a vertical surface, such as a ship bulkhead 50 in conventional manner by employing a plurality of fasteners 56.

Still referring to FIGS. 2, 3 and 4, two or more hook holding bars 58, 60 are secured to the bulkhead 50 in spaced relationship below the fixed base 12'. The hook holding bars terminate laterally in mounting flanges 70, 72 of suitable size to receive conventional fasteners 64 therethrough. If desired, the first and second hook holding bars 58, 60 can be provided with a plurality of laterally spaced hook receiving grooves 62 to conveniently receive and retain the fish hooks 42 which are associated with the lures 40 in preselected positions. By providing a number of laterally spaced hook receiving grooves 62, the operator can readily select any appropriate groove to position therein a fish hook 42 in order to retain the lure 40 in a convenient, compact, laterally adjusted position, depending upon the size and configuration of the other lures and the storage space available for the number of lures to be stored.

It will be appreciated that other hook holding bars could be provided in longitudinally spaced relation to the first and second hook holding bars 58, 60 to thereby accommodate more or larger lures and to conform to individual desires and requirements of the operator. It is contemplated that a cardboard or other planar material template could be provided in conjunction with the apparatus so that the spacing of the hook holding bars 58, 60 can be precisely adjusted relative to the base 12' to thereby provide uniform installation procedures despite the fact that the hook holding bars were in fact separately designed.

Referring now to FIG. 5, another embodiment 10" of the spool holder is illustrated wherein the trailing edge 74 of the base 12" is provided with a plurality of laterally spaced, alternate, long and short, flexible loops 76, 78 which are securely fastened in place. In this embodiment, it is contemplated that the fish hooks 42 of adjacent lures 40 could be positioned for storage within the adjacent long loops 78 and short loops 76 to thereby stagger the alignment of the plurality of lures 40 relative to the spool holding shaft 52". The relative sizes of the short loops 76 and long loops 78 can be adjusted as necessary to completely stagger the arrangement of the lures to achieve maximum efficiency in storage.

Referring now to FIG. 6, another embodiment 10''' of a spool holder is illustrated wherein the trailing edge 80 of the base 12''' is equipped with a plurality of elongated slots comprising short slots 82 and long slots 84. Preferably, the long slots 84 and short slots 82 alternate in position and are sized to receive and store therein the fish hooks 42 of a plurality of lures 40. By varying the lengths of the long slots 84 relative to the short slots 82, the lures can be efficiently staggered in position in a relatively simple and inexpensive construction.

Thus, it is seen that the spool holder 10, 10', 10", 10''' of the present invention can be employed conveniently to store a plurality of large lures efficiently in a minimum storage area without tangling and with maximum efficiency.

Referring now to FIGS. 7 and 8, there is illustrated a large diameter spool 34 which comprises generally a hub 86 for overfitting and frictionally securing to the spool shaft 52. A plurality of spokes 88 radially extend from the hub 86 and support a circular rim 90 in known manner. The large diameter spool 34 is particularly designed to receive and store approximately fifty feet of three hundred pound test monofiliment fishing line. As best seen in FIG. 8, the rim comprises an annular floor 92 which is defined between left and right circular walls 94, 96, which walls, together with the annular floor 92 define therewithin a monofiliment line storage area. A pin 98 projects non-radially outwardly through the fishing line storage area to provide a sturdy terminus for attaching the end 100 of the fishing line 38 being stored. In accordance with usual practice, the end 100 of the fishing line 38 can be tied into a loop to overfit the pin 98 by employing a suitable knot 104, or perhaps by utilizing a suitable metallic or other material fitting (not shown).

In view of the significant diameter of heavy duty fishing line, for example three hundred test monofiliment line, the knot 104 tends to be quite large, and without more, would take up a significant percentage of the line storage area defined between the circular walls 94, 96 to thereby severely limit the length of fishing line that could otherwise be stored. Accordingly, a recessed area 106 has been provided by varying the diameter of the spool rim 90 through a suitable arcuate length, for example, approximately one hundred and ten degrees from the pin 98 in the direction of line wind-up travel. A depth of recess of approximately ⅜ inch has proved to be satisfactory for the purpose to receive therein knots 104, swivels (not shown) or other bulky features which may be provided at the end of the fishing line 38 for end securing purposes. By providing the arcuate recess 106, the large diameter spools can be utilized to accommodate the desired length of three hundred pound test monofiliment line to be suitable for the purpose intended.

Although the present invention has been described with reference to the particular embodiments herein set forth, it is understood that the present disclosure has been made only by way of example, and that numerous changes in the details of the construction may be resorted to without departing from the spirit and scope of the invention. Thus, the scope of the invention should not be limited by the foregoing specification, but rather, only by the scope of the claims appended hereto.

What is claimed is:

1. A spool holder for storing a plurality of large fishing lures to which are respectively attached lengths of fishing lines comprising:
   a base, the base comprising a spool holding area and a lure storage area spaced from the spool holding area;
   a rotatable spool storing means affixed to the base in the spool holding area, the spool storing means comprising a rotatable shaft and a plurality of large diameter spools affixed for rotation on the shaft;
   the large diameter spools comprising peripheral circular storage areas for storing suitable lengths of monofiliment fishing line therein; and
   a plurality of hook holding means positioned in the lure storage area;
   the hook holding means comprising longitudinally staggered hook receiving means to retain pluralities of large diameter lures at staggered distances relative to the spool shaft.

2. The spool holder of claim 1 wherein the hook holding means comprises a plurality of openings formed in the base, the openings being arranged in at least two discreet, transverse rows, the rows being spaced at different distances from the shaft.

3. The spool holder of claim 2 wherein each row comprises a plurality of openings and wherein the openings of one row are laterally offset from the openings of the other row.

4. The spool holder of claim 1 wherein the hook holding means comprises a plurality of loops.

5. The spool holder of claim 4 wherein the base comprises a trailing edge and wherein the loops are secured at the trailing edge.

6. The spool holder of claim 5 wherein the loops comprise long loops and short loops.

7. The spool holder of claim 6 wherein the short loops alternate with the long loops.

8. The spool holder of claim 1 wherein the hook holding means comprises separate hook holding bars.

9. The spool holder of claim 8 wherein at least two separate hook holding bars are positioned in spaced relationship to the shaft, one of the hook holding bars being positioned further from the shaft than the other.

10. The spool holder of claim 9 wherein the hook holding bars comprise a plurality of transversely spaced hook receiving grooves.

11. The spool holder of claim 1 wherein the hook holding means comprises a single row of slots provided in the base.

12. The spool holder of claim 11 wherein the single row comprises long slots and short slots.

13. The spool holder of claim 12 wherein the long slots alternate with the short slots.

14. A rotatable spool for storing a length of high test monofiliment fishing line comprising a hub, an annular rim and a plurality of spokes interconnecting the hub and rim, the rim comprising an annular floor and outer circular walls extending radially outwardly from the floor, the floor being provided with an arcuate recess and a non-radially oriented pin.

15. The spool of claim 14 wherein the arcuate recess has a beginning and an end and wherein the pin is positioned at the beginning of the recess.

16. The spool of claim 15 wherein the arcuate recess extends through an arc of at least about one hundred and ten degrees.

* * * * *